3,663,504
RADIATION-RESISTANT PLASTIC INSULATORS
Bernard J. Sturm, Oak Ridge, and William W. Parkinson, Kingston, Tenn., assignors to the United States of America as represented by the United States Atomic Energy Commission
No Drawing. Filed Nov. 10, 1970, Ser. No. 88,484
Int. Cl. C08f 45/58, 51/58
U.S. Cl. 260—45.7 P                                         7 Claims

ABSTRACT OF THE DISCLOSURE

A high molecular weight organic composition useful as an electric insulator in radiation fields is provided and comprises normally a solid polymer of an organic compound having a specific resistance greater than $10^{19}$ ohm-cm. and containing phenyl groups and 1 to 7.5 weight percent of a high molecular weight organic phosphite. In one embodiment the composition comprises normally solid polystyrene having 7.5 weight percent tris-$\beta$-chloroethyl phosphite as an additive; the composition exhibited an increase in the post-irradiation resistivity of over an order of magnitude over the post-irradiation resistivity of pure polystyrene.

BACKGROUND OF THE INVENTION

The invention described herein was made in the course of, or under, an Interagency Agreement between the United States Atomic Energy Commission and the Office of Civil Defense. It relates generally to plastic insulator compositions and more particularly to radiation-resistant plastic electrical insulator compositions.

Various personnel-monitoring instruments have been designed to measure incident radiation exposure of the wearer. One such instrument is a dosimeter which consists generally of a miniature electrometer with an associated optical system and scale. The capacitor in such instruments is made of aluminum foil with plastic films or glass serving as electric insulators. The dosimeter is charged to a predetermined voltage (e.g., 160 volts) and upon being exposed to gamma radiation is partially discharged, the degree of discharge being related to dose. After having been worn for a specific period of time, the voltage is again checked on a reading device and the amount of radiation received by the chamber is determined by the decrease in voltage.

It is important in the manufacture of dosimeters that there be as small dielectric charging effects on capacitors as possible. Ordinary plastic films, as well as glass capacitors, lose their non-conducting qualities during exposure to ionizing radiation; and in both types of material, conductivity increases in magnitude with increased irradiation.

In order for plastic films to be useful as dielectrics in dosimeters they must have acceptably low conductivity prior to irradiation, be insensitive to moisture and show sufficiently rapid decay of conductivity after irradiation. While several of the myriad plastic compositions had low enough pre-irradiation conductivity, these compositions in pure form did not exhibit good post-irradiation decay properties. Generally, these materials were found to decay in a complex manner with one or more long-lived components in most of the materials tested.

For these reasons, in the past, certain proprietary compounds, chiefly copolymers of styrene and $\alpha$-methyl styrene, have been used as dielectrics in dosimeters. The protective ability of such materials has been ascribed to the presence of some unknown chemical since the rate of decay was proportional to the quantity of impurities in the base polymers. It is known that various "impurities" such as antioxidants, stabilizers, etc., have been added in concentrations of about 0.1 weight percent (higher concentrations being deemed unnecessary and uneconomical) to plastic compositions, such as polyolefins, synthetic rubbers or complex copolymers (e.g., high impact polystyrene). These additives when tested in various plastic compositions did not demonstrate any protective ability from gamma radiation.

Because of quality variation from batch to batch, which makes the proprietary chemical unpredictable, it is desirable to provide a dependable, homogeneous plastic composition which retains its electrical resistivity properties, especially after exposure to radiation.

SUMMARY OF THE INVENTION

We have discovered that 1 to 7.5 weight percent of a high molecular weight organic phosphite when added to a solid organic polymer having a specific resistance greater than $10^{19}$ ohm-cm. and containing phenyl groups provides a high molecular weight organic composition which has improved radiation resistance. In one embodiment of our invention plastic films formed from a solution of polystyrene or polyphenylene oxide, tris ($\beta$-chloroethyl) phosphite and toluene were found to have sufficient low pre-irradiation ductility and good post-irradiation decay properties to render the plastic composition useful as dielectrics in charge storing devices such as dosimeters.

BRIEF DESCRIPTION OF THE INVENTION

It will be appreciated that, while our invention is hereinafter described with particular reference to a radiation-resistant plastic film which is useful as an insulator in electrostatic dosimeters, the invention is broadly applicable to plastic compositions of various shapes that are prepared by widely differing processes for use as electric insulators or dielectrics.

In accordance with our invention radiation-resistant plastic compositions are prepared by adding a high molecular weight organic phosphite in the critical amount of 1 to 7.5 weight percent to certain polymeric compositions. The polymeric compositions used in our invention should have a specific resistance greater than $10^{19}$ ohm-cm. and contain phenyl groups. Non-limiting examples of these compositions are polystyrene, polyphenylene oxide, etc. It is postulated that the presence of a phenyl group in combination with the organic phosphite is what renders our plastic compositions resistant to gamma radiation. The polymeric compositions are available commercially as normally solid products.

We have found that ionic impurities, e.g., $Na^+$, $Cl^-$, increase the sensitivity of the polymer to atmospheric moisture which may increase the pre- and post-irradiation conductivity of the compositions. While the upper limit of these ionic impurities has not been firmly established, ionic impurities in a concentration of about 0.25 weight percent may be tolerated in the starting polymeric material. Where the ionic impurities are higher than this concentration, remedial methods may be resorted to for lowering the concentration of the ionic impurities. Reduction of ionic impurities, in, for example, polystyrene prepared by ordinary emulsion polymerization may be achieved by coagulation of the polymer in the emulsion by freezing, followed by filtering and washing. This technique provides a polymeric product having less than half the ash content of those commercially available, the ash content being indicative of the lower ionic impurities. The polymer may also be extruded into the final insulator film which renders the surface more uniform and apparently decreases the sensitivity of the polymer product to moisture.

The plastic film of our invention may be prepared by a standard film casting process with certain modifications as described hereinafter. Film casting of the polymer from solution is preferably carried out using a finely-divided bulk polymer which is vacuum outgassed at 90°–95° C. for about 24 hours to remove volatiles. Previously, plastic films were cast from dilute solution (e.g., 5 to 10 percent). We prefer that the film be cast from a concentrated solution comprising 20 to 25 weight percent polymer in a freshly-opened, dry, reagent-grade benzene hydrocarbon solvent. While casting from such a concentrated solution requires mechanical spreading, there is less contraction upon drying and provides a more dense surface which, advantageously, decreases the sensitivity of the film to moisture. Other hydrocarbon solvents, particularly the aromatics, may be equally used as the solvent.

Any trialkyl, triaryl, trialkaryl or triaralkyl phosphites, or any combination thereof, is suitable as the additive to the afore-described polymeric composition. It is critical to our invention that the high molecular weight organic phosphite additive be provided in a concentration of 1 to 7.5 weight percent in the polymeric composition. At concentrations below 1 weight percent we have found essentially no improvement in the post-irradiation resistivity of the plastic composition. Above 7.5 weight percent the organic phosphite as the additive decreases the pre-irradiation resistivity of the plastic composition. It is quite remarkable and completely unexplicable that 1 to 7.5 weight percent of an organic phosphite when added to the polymeric compositions of this invention provides the markedly improved resistivity that we have found in our insulator compositions.

Heretofore, organic phosphites have been added to various polymeric materials as an anti-oxidant to reduce environmental aging, i.e., oxidation in air and deterioration under the ultraviolet light in sunlight.

The concentration of these phosphites, however, was limited to about 0.1 weight percent. We have found that for providing a radiation-resistant polymeric product a phosphite concentration below 1 weight percent was ineffective in achieving this effect.

As noted hereinbefore, plastic films prepared for use as insulators or dielectrics in electrostatic dosimeters are quite sensitive to various process conditions. In addition to employing polymeric compositions having minimal ionic impurities, it is extremely important to achieving reproducibly the high resistivities found in our polymeric products that the film be prepared under low humidity conditions, such as below 40 percent. As a general observation dielectrics under anhydrous conditions have resistivities about four orders of magnitude higher than the values under moist conditions.

With regard to our organic phosphite additives, the high molecular weight polymeric organic phosphites, such as Wytox 540 [a polymeric phosphite (hydrolyzable) registered as a trademark with National Poly Chemicals, Inc., Wilmington, Mass] have been found to give somewhat more reproducible resistivities. This may be due to the fact that the low molecular weight organic phosphites, such as tris-$\beta$-chloroethyl phosphite, have higher volatilities than the polymeric organic phosphites and may tend to diffuse to the surface and be lost to the composition. Accordingly, when the plastic compositions are to be exposed to temperatures above about 50° C. we prefer to use a polymeric organic phosphite as the additive.

When D.C. potential is impressed across a medium with a finite capacitance there will always be some increase in capacitance (or decrease in resistivity). This dielectric charging or relaxation results from the polarization of the dielectric caused by slight displacement of positive and negative charges within the material.

Ionizing radiation is known to increase the conductivity of die-electrics. In air chamber dosimeters the contribution to the collected charge from the dielectric is negligible during the irradiation period. What happens to post-irradiation conductivity is more of a problem. While one would expect prompt disappearance of excess charge carriers after irradiation, it has previously been shown that radiation-induced conductivity decays slowly, decreasing in rate at longer times.

For purposes of evaluating candidate dielectrics for use in electrostatic dosimeters, limits have been set as to the allowable pre- and post-irradiation conductivity. As a pre-irradiation requirement the material must not exhibit a drift of over 2 percent in 96 hours after charging the dosimeter to a zero reading; the dosimeter after exposure to radiation must not drift over 5 percent of range in 4 hours. Neither pure polystyrene nor polyphenylene oxide meets both these requirements. While both plastic compositions in pure form have sufficiently low pre-irradiation conductivity to meet the first requirement, the post-irradiation conductivity for these compositions over $10^5$ seconds is too high, the post-irradiation conductivity of polystyrene being much greater than that allowed for suitable dielectrics for electrostatic dosimeters. The post-irradiation conductivity, quite obviously, is the dominant factor in selecting dielectrics for use in electrostatic dosimeters; hence, both plastics in pure form are unsuitable for this case.

In marked contrast the presence of our organic phosphites in the specified concentration range rendered both polystyrene and polyphenylene oxide compositions suitable as dielectrics for electrostatic dosimeters.

Having described the invention in a general fashion the following examples are given to more clearly delineate the process parameters and techniques used to prepare our novel dielectric materials.

Example I

A polystyrene film was prepared by film casting techniques using a dilute solution as follows. Four (4) grams polystyrene (Dow Experimental, QX–4500 having a molecular weight in the range of 300,000 to 600,000), 96 grams analytical reagent-grade toluene and 0.3 gram tris-$\beta$-chloroethyl phosphite were mixed together. The resulting solution was spread by careful pouring on a leveled glass plate to form a film. The casting plate was then placed in a loose-fitting covered dish and the solution allowed to dry with retarded evaporation; evaporation to dryness required about 16 hours. The dried film was next immersed in distilled water, removed from the glass plate and conditioned by heating to a temperature of about 90° C. for 24 hours in a vacuum oven ($\sim$0.5 mm. Hg).

Aluminum electrodes were vapor deposited onto the plastic film (4" x 4" x .002") and the conductivity and capacitance of the film determined with a vibrating reed electrometer. The film which was rolled into a cylinder was irradiated in a cobalt-60 source to 2000 rads at 200 rads/sec.

After removal from the radiation source, the film was tested electrically with a vibrating reed electrometer. Pre-irradiation conductivity of the film was $4 \times 10^{-6}$ and $4 \times 10^{-8}$ mho/farad at $10^{-2}$ and $10^4$ seconds, respectively. Post-irradiation conductivity of the film was $3 \times 10^{-6}$ and $4 \times 10^{-8}$ mho/farad at $10^3$ and $10^5$ seconds, respectively. The post-irradiation conductivity was approximately an order of magnitude lower than that for pure polystyrene. The tris-$\beta$-chloroethyl phosphite additive enabled the polystyrene film to quickly recover its normal insulating capability, whereas the pure polystyrene did not exhibit a quick recovery of its normal insulating capability.

Example II

A polystyrene film was prepared by casting techniques as in Example I, except the film was cast from a concentrated solution prepared by mixing 15 grams polystyrene (Dow Experimental, QX–4500) 35 grams benzene, and 0.6 gram ($\sim$4 weight percent) high molecular weight polymeric organic phosphite (National Poly Chemicals, Wytox, X–540) and mechanically spread with a "doctor" blade on a glass plate. Aluminum electrodes were vapor deposited onto the resultant polystyrene film and the film rolled into a cylinder. The film was then irradiated in a cobalt-60 source to 2000 rads at 200 rads/sec.

After irradiation the film was tested electrically with a vibrating reed electrometer. The film had a pre-irradiation conductivity of $<6 \times 10^{-8}$ mho/farad at $10^2$ seconds and a post-irradiation conductivity of $2 \times 10^{-8}$ mho/farad at $10^5$ seconds. This film met both the pre- and post-irradiation conductivity criteria for dielectric materials which are useful in electrostatic dosimeters.

Example III

A number of films of polystyrene and polyphenylene oxide having various additive additions were prepared by the general method shown in Example I and tested electrically with a vibrating reed electrometer. In one composition 0.3 weight percent of a di-t-butyl-cresol was added along with the organic phosphite to test the synergistic effect of such additives. The results are given in the table below.

lator in radiation fields comprising a polymer selected from the group consisting of polystyrene and polyphenylene oxide containing 1 to 7.5 weight percent tris-$\beta$-chloroethyl phosphite.

2. The composition of claim 1 wherein said polymer is polystyrene.

3. The composition of claim 1 wherein said polymer is polyphenylene oxide.

4. A method of improving the electrical resistivity properties of a polymer selected from the group consisting of polystyrene and polyphenylene oxide comprising the steps of providing said polymer with an ionic content of less than 0.25 weight percent and adding 1.0 to 7.5 weight percent tris-$\beta$-chloroethyl phosphite to said polymer while simultaneously maintaining the ambient humidity at less than 40 percent.

5. The method according to claim 4 wherein said polymer is polystyrene.

6. The method according to claim 4 wherein said polymer is polyphenylene oxide.

TABLE.—ELECTRICAL CONDUCTIVITY [a]

| Plastic/additive | Concentration of additive, wt. percent | Before irradiation | | After irradiation | | Radiation dose rate |
|---|---|---|---|---|---|---|
| | | $10^2$ sec. mho/farad | $10^4$ sec. mho/farad | $10^3$ sec. mho/farad | $10^5$ sec. mho/farad | |
| 1. Polystyrene [b] | 0 | $9 \times 10^{-7}$ | $\sim 7 \times 10^{-9}$ | $1 \times 10^{-5}$ | $\sim 7 \times 10^{-7}$ | 1,800 |
| 2. Polyphenylene oxide | 0 | $<6 \times 10^{-8}$ | $<6 \times 10^{-8}$ | $2 \times 10^{-6}$ | $8 \times 10^{-7}$ | 1,800 |
| 3. Polystyrene: | | | | | | |
| {Di-t-butyl-p-cresol | 0.3 | | | $<6 \times 10^{-8}$ | [c] $<5 \times 10^{-7}$ | 2,000 |
| {Tris-$\beta$-chloroethylphosphite [d] | 7.5 | | | | | |
| Polymeric phosphite, Argus M260 [b] | 1.0 | | | $<6 \times 10^{-8}$ | [c] $<5 \times 10^{-7}$ | 2,000 |
| Polymeric phosphite, Argus M329 [b] | 1.0 | | | $\sim 10^{-7}$ | [c] $\sim 5 \times 10^{-7}$ | 2,000 |
| Polymeric phosphite (non-hydrolyzing) Wytox 355 [d] | 1.1 | | | $<6 \times 10^{-8}$ | [c] $<5 \times 10^{-7}$ | 2,000 |
| 4. Polyphenylene oxide: Tris-$\beta$-chloroethyl phosphite [d] | 1.0 | | | $<10^{-7}$ | $5 \times 10^{-8}$ | 2,000 |

[a] To convert mho/farad to (ohm-cm.)$^{-1}$ multiply by $\sim 2 \times 10^{-13}$.
[b] These materials meet 2% drift in 96 hours prior to irradiation (conductivity limit: $6 \times 10^{-8}$ mho/farad at $10^2$ sec.).
[c] Measured at 57° C.
[d] These materials meet above requirements plus 5% drift in 4 hours after 2,000 rads (conductivity limit: $6 \times 10^{-8}$ mho/farad at $10^3$ seconds and $7 \times 10^{-8}$ mho/farad at $10^5$ seconds).

While the polymeric phosphite (Argus M329) additive provided a pre-irradiation conductivity which met the criteria for electrostatic dosimeters, the post-irradiation conductivity was slightly outside the required value for conductivity at $10^5$ seconds. This slight increase in post-irradiation conductivity might be attributable to excessive impurities present in the commercial grade organic phosphite.

In summary, it has been shown that incorporating from 1 to 7.5 weight percent of an organic phosphite in a normally solid polymer which has a specific resistance greater than $10^{19}$ ohm-cm. and which contains phenyl groups (i.e., polystyrene, polyphenylene oxide, etc.) markedly improves the resistivity of the plastic when exposed to radiation, such as gamma rays, and in some compositions rendered the plastics useful in a most extreme useage—dielectrics for electrostatic dosimeters. Accordingly, there is imparted to these plastic compositions radiation resistance.

It is therefore to be understood that all matters contained in the above given description are illustrative only with many modifications and variations being made by those skilled in the art without departing from the scope of the invention, which is to be limited only by those indicated in the appended claims.

What is claimed is:

1. A composition of matter useful as an electrical insu-

7. The method according to claim 4 wherein said step of adding comprises dissolving said polymer and said tris-$\beta$-chloroethyl phosphite in a benzene hydrocarbon solvent and allowing the solvent to evaporate.

References Cited

UNITED STATES PATENTS

| | | | |
|---|---|---|---|
| 3,456,041 | 7/1969 | Burk et al. | 260—961 |
| 3,578,625 | 5/1971 | Nakashio et al. | 260—45.75 |
| 3,429,837 | 2/1969 | Langrish et al. | 260—2.5 |
| 3,513,134 | 5/1970 | Filius | 260—78 |
| 3,527,725 | 9/1970 | Strauss et al. | 260—29.3 |
| 3,516,963 | 6/1970 | Friedman | 260—45.8 |
| 2,806,831 | 9/1957 | Beindorff | 260—32.6 |
| 3,208,959 | 9/1965 | Gmitter | 260—2.5 |
| 3,342,654 | 9/1967 | Golonka et al. | 317—258 |
| 3,531,641 | 9/1970 | Weissenberg | 250—83 |

DONALD E. CZAJA, Primary Examiner

R. A. WHITE, Assistant Examiner

U.S. Cl. X.R.

204—159.18; 250—83 R; 260—47 ET, 93.5 A, 823, 874; 317—259